United States Patent
Abrol et al.

(10) Patent No.: US 6,909,714 B2
(45) Date of Patent: Jun. 21, 2005

(54) METHOD AND APPARATUS FOR DETERMINING CONFIGURATION OPTIONS NEGOTIATED FOR A COMMUNICATIONS LINK EMPLOYING A NETWORK MODEL

(75) Inventors: Nischal Abrol, San Diego, CA (US); Marcello Lioy, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 59 days.

(21) Appl. No.: 09/957,552

(22) Filed: Sep. 19, 2001

(65) Prior Publication Data

US 2003/0007479 A1 Jan. 9, 2003

Related U.S. Application Data

(60) Provisional application No. 60/303,022, filed on Jul. 3, 2001.

(51) Int. Cl.[7] .............................................. H04L 12/56
(52) U.S. Cl. ..................... 370/389; 370/469; 370/252
(58) Field of Search ................................ 370/254, 310, 370/349, 389, 392, 252, 465, 469

(56) References Cited

U.S. PATENT DOCUMENTS

| | | | |
|---|---|---|---|
| 5,978,386 A | | 11/1999 | Hamalainen et al. |
| 6,370,118 B1 | * | 4/2002 | Lioy et al. .................. 370/235 |
| 6,377,556 B1 | * | 4/2002 | Lioy et al. .................. 370/310 |
| 6,463,034 B1 | * | 10/2002 | Abrol et al. ................. 370/229 |
| 6,542,504 B1 | * | 4/2003 | Mahler et al. ............... 370/392 |

FOREIGN PATENT DOCUMENTS

| | | |
|---|---|---|
| WO | 0008822 | 2/2000 |
| WO | 0076173 | 12/2000 |
| WO | 02067542 | 8/2002 |

OTHER PUBLICATIONS

Albrecht et al. "IP Services over Bluetooth: Leading the Way to a New Mobility". IEEE. Oct. 18–20, 1999. pp. 2–11.*

* cited by examiner

Primary Examiner—Chi Pham
Assistant Examiner—Derrick W Ferris
(74) Attorney, Agent, or Firm—Philip Wadsworth; Charles D. Brown; Kyong H. Macek

(57) ABSTRACT

A technique is described for determining configuration options negotiated for a wireless communications link employing a network model. The technique receives an input data stream from a wireless communications link employing a network model. The input data stream includes one or more framed data packets containing information. The wireless communications link employing the network model is based on configuration options negotiated. The framed data packet(s) from the input data stream are detected and at least a portion of the information of the detected framed data packet(s) is examined when the configuration options of the wireless communications link employing the network model have been negotiated.

24 Claims, 8 Drawing Sheets

METHOD AND APPARATUS FOR DETERMINING CONFIGURATION OPTIONS NEGOTIATED FOR A COMMUNICATIONS LINK EMPLOYING A NETWORK MODEL

RELATED APPLICATIONS

This application claims priority to provisional application No. 60/303,022, filed on Jul. 3, 2001.

BACKGROUND

1. Field of the Invention

This invention generally relates to the field of wireless communications. More particularly, the present invention relates to determining configuration options of a wireless communications link employing a network model operation of a mobile terminal machine.

2. Description of Background Information

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

Recent innovations in wireless communication and computer-related technologies, as well as the unprecedented growth of Internet subscribers, have paved the way for mobile computing. In fact, the popularity of mobile computing has placed greater demands on the current Internet infrastructure to provide mobile users with more support. CDMA technology is a crucial part of meeting these demands and providing users with the necessary support.

Wireless communication systems employing this technology assign a unique code to communication signals and spread these communication signals across a common (wideband) spread spectrum bandwidth. As long as the receiving machine in a CDMA system has the correct code, it can successfully detect and select its communication signal from the other signals concurrently transmitted over the same frequency band. The use of CDMA produces an increase in system traffic capacity, improves overall call quality and noise reduction, and provides a reliable transport mechanism for data service traffic.

FIG. 1 illustrates the basic elements of such a wireless data communication system 100. Artisans of ordinary skill will readily appreciate that these elements, and their interfaces, may be modified, augmented, or subjected to various standards, without limiting their scope or function.

System 100 allows a mobile terminal equipment, TE2 device 102 (Terminal Equipment 2, a data terminal that provides a non-ISDN user-network interface, such as a laptop or palmtop computer), to communicate with an Interworking Function (IWF) 108. (In CDMA2000, the relevant data standards are IS707A and IS835. In IS835, the IWF is replaced by the PDSN (Packet Date Serving Node). For purposes of discussion, IWF 108 as used hereafter shall refer to both IWF and PDSN.

System 100 includes a wireless communication device, MT2 device 104 (Mobile Terminal 2, a mobile station termination that provides a non-ISDN user-network interface, such as a wireless telephone), and a Base Station/Mobile Switching Center (BS/MSC) 106. IWF 108, for example, supports data calls and serves as a gateway between the wireless network and other networks, such as the Public Switched Telephone Network or wireline packet data networks providing Internet- or Intranet- based access.

As illustrated in FIG. 1, IWF 108 is coupled to BS/MSC 106 via the L interface. (In IS835, the L interface is more generally referred to as the R-P link or the A-interface.)

Often IWF 108 will be co-located with BS/MSC 106. TE2 device 102 is electronically coupled to MT2 device 104 via the $R_m$ interface. MT2 device 104 communicates with BS/MSC 106 via the wireless interface $U_m$. TE2 device 102 and MT2 device 104 may be integrated into a single unit or may be separated out, as in the case of an installed mobile phone unit in which a laptop is TE2 device 102 while the transceiver is MT2 device 104. The combination of TE2 device 102 and MT2 device 104, whether integrated or separate, is generally referred to as a mobile station (MS) 103.

Other support is made possible by applying various protocols to control, manage, or otherwise facilitate different aspects of wireless communications. For example, the Internet Protocol (IP) has been incorporated in wireless communications to accommodate packet-oriented services. The IP protocol specifies the addressing and routing of packets (datagrams) between host computers, and is defined in Request For Comment 791 (RFC 791) entitled, "INTERNET PROTOCOL DARPA INTERNET PROGRAM PROTOCOL SPECIFICATION," published in September 1981.

The IP protocol is a network layer protocol that encapsulates data into IP packets for transmission. Addressing information is part of the header of the packet. IP headers (e.g., IP version 4) contain 32-bit addresses that identify the sending and receiving hosts. These addresses are used by intermediate routers to select a path through the network for the packet towards its ultimate destination at the intended address. Then, the IP protocol allows packets originating at any Internet node in the world to be routed to any other Internet node in the world, given that the originating party knows the IP address of the destination party. This also applies to the Internet Protocol version 6 (IPv6) the only difference being that IPv6 employs 128 bit addresses, and has other optimizations to air in routing.

Another protocol incorporated in wireless communication systems is the Point-to-Point Protocol (PPP) protocol, which provides, inter alia, Internet access. The PPP protocol is described in Request for Comments 1661 (RFC 1661), entitled "THE POINT-TO-POINT PROTOCOL (PPP)," published in July 1994.

For example, the PPP protocol specifies a method for transporting multi-protocol datagrams over point-to-point links and contains three components: a Link Control Protocol (LCP) for establishing, testing, configuring, and maintaining a data link connection; a family of Network Control Protocols (NCPs) for establishing and configuring different network-layer protocols; and encapsulating multi-protocol datagrams over serial links.

In an effort to provide a host of services on wireless communication systems, various standards have been developed to accommodate the wireless data transmission between TE2 device 102 and IWF 108. For example, the TIA/EIA IS-707.5 standard, entitled "DATA SERVICE OPTIONS FOR WIDEBAND SPREAD SPECTRUM SYSTEMS: PACKET DATA SERVICES," published in February 1998, defines requirements for support of packet data transmission capability on TIA/EIA IS-95 systems and specifies a suite of packet data bearer services. Also, the TIA/EIA IS-707-A.5 standard, entitled "DATA SERVICE OPTIONS FOR SPREAD SPECTRUM SYSTEMS: PACKET DATA SERVICES," and the TIA/EIA IS-707-A.9 standard, entitled "DATA SERVICE OPTIONS FOR SPREAD SPECTRUM SYSTEMS: HIGH-SPEED PACKET DATA SERVICES," both published in March 1999, define requirements for packet data transmission support on TIA/EIA IS-95 and CDMA2000/IS-2000 systems.

These standards provide certain packet data service options that may be used to communicate between TE2 device 102 and IWF 108 via BS/MSC 106. In doing so, IS-707.5 introduces the Network Model, which details the packet data protocol requirements for the $R_m$ and $U_m$ interfaces. Under this model, two separate PPP links are provided at the data link layer: a first PPP link ($PPP_R$) provides the data link layer between TE2 device 102 and MT2 device 104 (i.e., across the $R_m$ interface), and a second PPP link ($PPP_u$), independent of the first, provides the data link layer between MT2 device 104 and IWF 108 (i.e., across the $U_m$ and L interfaces).

The separate and independent PPP links help support "transparent mobility;" that is, TE2 device 102 should experience seamless and transparent service, regardless of time and its current IWF 108 point-of-attachment. As such, TE2 device 102 remains unaffected by location changes, such as PPP renegotiations occurring on the $U_m$ link, such as when MT2 device 104 attempts to attach to a different IWF 108. Thus, the Network Model operates to isolate the $PPP_R$ link from the $PPP_U$ link to prevent changes on the $U_m$ link from affecting the $R_m$ link. In other words, the $PPP_U$ link may be renegotiated, inter alia, without forcing the $PPP_R$ link to renegotiate.

FIG. 2 illustrates the protocol stacks in each entity of the IS-707.5 Network Model. At the far left of FIG. 2 is a protocol stack, shown in conventional vertical format, depicting the protocol layers running on TE2 device 102 (e.g., the mobile terminal, laptop or palmtop computer). TE2 device 102 protocol stack is illustrated as coupled to MT2 device 104 protocol stack via the $R_m$ interface. MT2 device 104 is illustrated as coupled to BS/MSC 106 protocol stack via the $U_m$ interface. BS/MSC 106 protocol stack is, in turn, illustrated as coupled to IWF 108 protocol stack via the L interface.

By way of example, the protocols depicted in FIG. 2, operate as follows: a PPP layer on TE2 102 device associated with the $R_m$ interface (i.e., $PPP_R$ 208) encodes (e.g., frames) packets of an upper layer protocol 204, and a network layer IP protocol 206. $PPP_R$ protocol 208 then transmits the packets across the $R_m$ interface, for example, using a TIA/EIA 232-F layer protocol 210 to a TIA/EIA-232-F layer protocol 212 on MT2 device 104. The TIA/EIA-232-F standard is defined in "INTERFACE BETWEEN DATA TERMINAL EQUIPMENT AND DATA CIRCUIT-TERMINATING EQUIPMENT EMPLOYING SERIAL BINARY DATA INTERCHANGE," published in October 1997. Other standards or protocols may also be used to define the transmission across the $R_m$ interface. For example, other applicable $R_m$ interface standards may include, the "UNIVERSAL SERIAL BUS (USB) SPECIFICATION, Revision 1.1," published in September 1998, and the "BLUETOOTH SPECIFICATION VERSION 1.0A CORE," published in July 1999.

TIA/EIA 232-F protocol 212 on MT2 device 104 receives the packets from TE2 device 102 and passes them to a $PPP_R$ layer 213 of MT2 device 104. $PPP_R$ layer 213 unframes the packets within the PPP frames and, when a data connection is established, may transfer the packets to a PPP layer associated with the $U_m$ interface (e.g., $PPP_U$ protocol 217). $PPP_U$ layer 217 re-frames the packets for transmission to a $PPP_U$ peer located in IWF 108. A Radio Link Protocol (RLP) layer 216 and an IS-95 layer protocol 214, both of which are well known in the art, may be used to transmit the packet-encapsulated PPP frames to BS/MSC 106 over the $U_m$ interface. RLP layer protocol 216 is defined in the IS-707.2 standard, entitled "DATA SERVICE OPTIONS FOR WIDEBAND SPREAD SPECTRUM SYSTEMS: RADIO LINK PROTOCOL," published in February 1998, and also in the IS-707-A.2 standard, entitled "DATA SERVICE OPTIONS FOR SPREAD SPECTRUM SYSTEMS: RADIO LINK PROTOCOL," published in March 1999.

A RLP layer protocol 222 and an IS-95 layer protocol 220 in BS/MSC 106 transfer the packets to a relay layer protocol 224 for transmission across the L interface to a relay layer protocol 234 on IWF 108. $PPP_U$ layer 232 then un-frames the received packets and transfers them to a network layer protocol IP 230, which in turn passes them to a upper layer protocol 228 or forwards them to the their final destination. As stated above, $PPP_R$ layer protocol 213 may transfer the packets to $PPP_U$ layer protocol 217 when a data link connection is established. RFC 1661 provides that Link Control Protocol (LCP) packets may be exchanged and negotiated over each PPP link (i.e., $PPP_R$ and $PPP_U$) to establish, configure, and test the data link connection, as illustrated in FIG. 3. Once the LCP packets (see flow arrows (1A) and (1B) of FIG. 3) are exchanged, the link options negotiated, and the data link connection established, a network layer connection may be established between TE2 device 102 and IWF 108. In FIG. 2, network layer protocols 206, 215, 218, 230 (i.e., the IP layer protocols) use the Internet Protocol Control Protocol (IPCP) (see flow arrow (2) of FIG. 3) to negotiate the IP protocol on the PPP links to achieve the end-to-end connection between TE2 device 102 and IWF 108. IPCP is a part of a family of Network Control Protocols (NCPs) that are part of the PPP protocol, and is described in Request for Comment (RFC) 1332, "THE PPP INTERNET PROTOCOL CONTROL PROTOCOL (IPCP)," published in May 1992. When the system supports IPv6, IPCPv6 may also be negotiated, it is described in RFC 2472.

IPCP utilizes configuration request messages to negotiate various configuration options. One such option is the IP Compression Protocol Option. When enabled, this option generally employs the Van Jacobson compression methodology for compressing the TCP/IP headers in a PPP packet. The Van Jacobson compression methodology improves the efficiency of a protocol by reducing the overhead in the packet headers, and is described in RFC 1144 entitled, "COMPRESSING TCP/IP HEADERS FOR LOW-SPEED SERIAL LINKS," published in February 1990. The negotiation of the IP compression protocol option uses a specification of a maximum compression slot ID field, used to determine the maximum number of compression and decompression slots for a particular PPP link. As stated above for the IS-707.5 Network Model, the $PPP_U$ link may be renegotiated without forcing the $PPP_R$ link to renegotiate. During an initial call set-up, the LCP and IPCP mechanisms negotiate to establish identical configuration options for both the $U_m$ and $R_m$ interfaces. As long as the configuration options remain identical, all of the PPP data packets (see flow arrow (3) of FIG. 3) may "pass through" from one interface to the other without MT2 device 104 examining the packets.

Presently, however, MT2 device 104 examines the contents of each and every packet to determine the configuration options. In cases where the configuration options remain identical, however, such examination is unnecessary, as it adversely affects the processing resources and throughput latency of MT2 device 104.

SUMMARY OF THE INVENTION

A technique is described for determining configuration options negotiated for a wireless communications link employing a network model. The technique receives an input data stream from a wireless communications link employing a network model. The input data stream includes one or more framed data packets containing information.

The wireless communications link employing the network model is based on configuration options negotiated. The framed data packet(s) from the input data stream are detected and at least a portion of the information of the detected framed data packet(s) is examined when the configuration options of the wireless communications link employing the network model have been negotiated.

DETAILED DESCRIPTION

A technique is described for determining configuration options negotiated for a wireless communications link employing a network model. The technique receives an input data stream from a wireless communications link employing a network model. The input data stream includes one or more framed data packets containing information. The wireless communications link employing the network model is based on configuration options negotiated. The framed data packet(s) from the input data stream are detected and at least a portion of the information of the detected framed data packet(s) is examined when the configuration options of the wireless communications link employing the network model have been negotiated.

When the configuration options change, MT2 device 104 may intervene. Because MT2 device 104 is mobile, it is capable of moving to an area that is served by an IWF 108 that is different from the original IWF 108. When this happens, MT2 device 104 is "handed off" to the new IWF 108 for service. This handoff may require the renegotiation of particular LCP and IPCP configuration options over the $U_m$ interface as well as the intervention of MT2 device 104. When MT2 device 104 simply "passes" the packets containing the configuration options, without examining the contents therein, the packets force the end-to-end resynchronization of the entire link, thereby terminating the independence of the $R_m$ and $U_m$ links. Therefore, in cases where the configuration options change, MT2 device 104 may examine the packets.

Thus, one embodiment of the present invention determines the configuration options negotiated of a communications link employing a network model by selectively examining the PPP packets. The detailed description then refers to the accompanying drawings that illustrate embodiments of the present invention. Other embodiments are possible and modifications may be made to the embodiments without departing from the spirit and scope of the invention. Therefore, the detailed description is not meant to limit the invention. Rather the scope of the invention is defined by the appended claims, and their equivalents.

Figure 4:
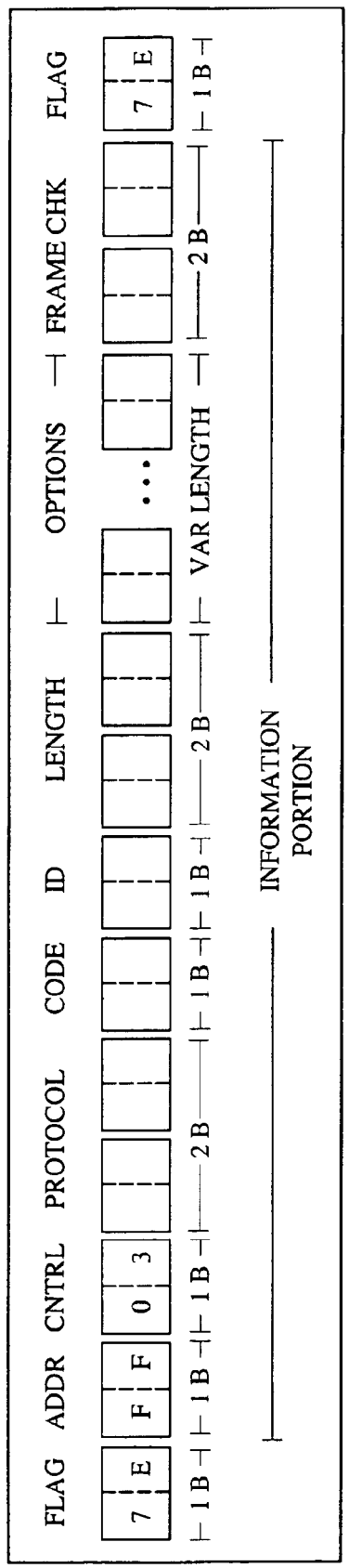
FIG. 4 depicts the general format of a HDLC frame.

Because the embodiments described herein operate on framed data packets, FIG. 4 illustrates various attributes of HDLC (high rate data link control) frames, which encapsulate PPP packets or upper layer protocol (e.g., IP protocol and Van Jacobson—compressed and uncompressed—protocol) packets. The beginning (and end) of the HDLC frame is demarcated by a 1-byte framing flag represented by the hexadecimal character "7E." The following two bytes indicate the protocol address and control field which, for standard PPP packets, are typically designated as the hexadecimal characters "FF" and "03," respectively. The next two bytes indicate the protocol type, such as: the LCP protocol, denoted by the hexadecimal characters "C0" and "21;" the IPCP protocol, indicated by the hexadecimal characters "80" and "21;" the TCP compressed state, indicated by the hexadecimal characters "00" (which is a byte that may be compressed out when protocol field compression is enabled during LCP negotiation) and "2D;" and the TCP uncompressed state, indicated by the hexadecimal characters "00" and "2F." The subsequent bytes of the frame comprise part of an information portion, which may hold an IP packet.

Figure 5:
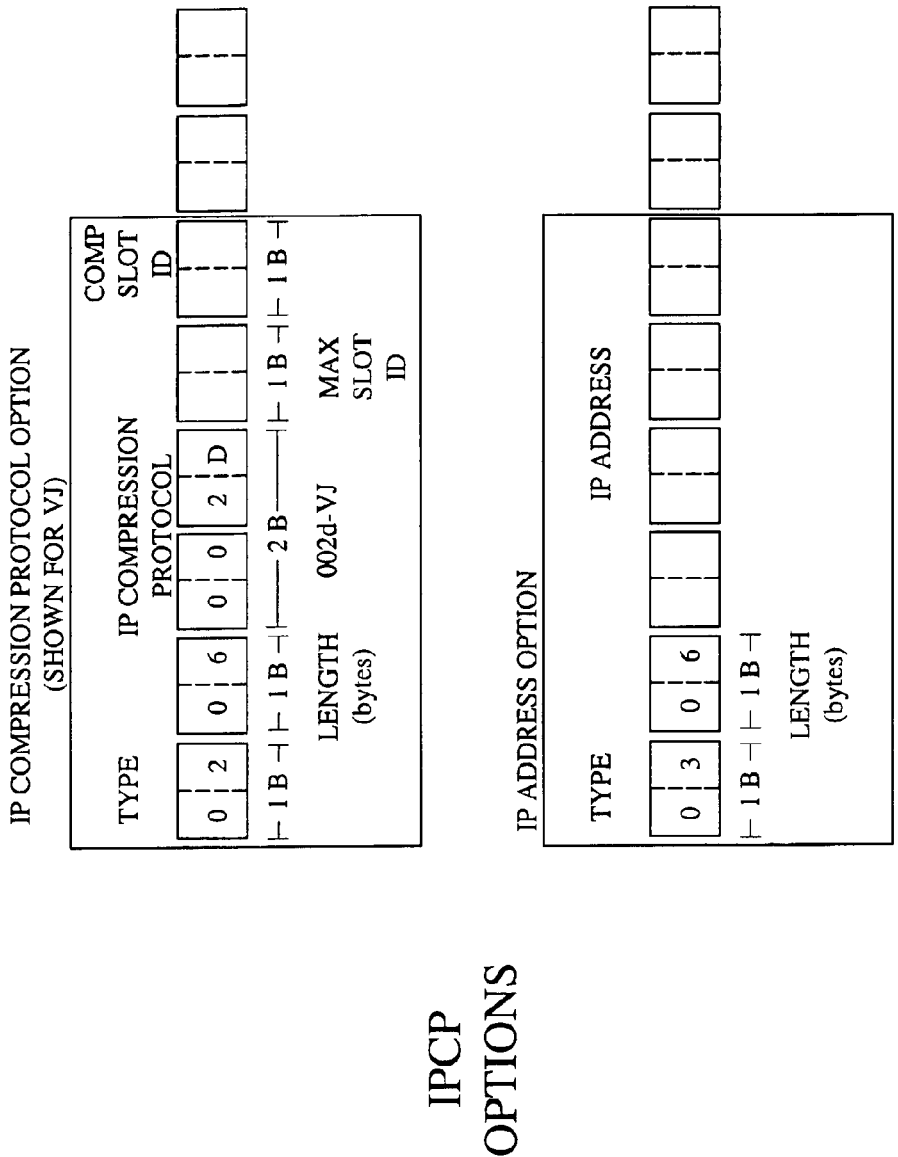
FIG. 5 depicts IPCP configuration options.

A MT2 device 104 (see FIG. 3) may selectively examine at least part of the information portion of detected HDLC frames, which encapsulate PPP or upper layer protocol packets, to determine IPCP configuration options negotiated for a communications link. MT2 device 104, for example, may selectively determine the IPCP configuration options negotiated for a communications link (e.g., $R_m$ interface and/or $U_m$ interface) by examining the information portion of a predetermined number of frames (e.g., HDLC frames) or packets (e.g., IP and/or Van Jacobson packets) detected. The IPCP configuration options illustrated in FIG. 5 and affixed to the options field of HDLC frames (illustrated in FIG. 4) include addressing information (e.g., IP address), Van Jacobson compression state, and Van Jacobson compression slot ID. In FIG. 5, the (PPP) protocol field, which is one or two bytes (values in hex), may include: (i) type IP—the IP protocol is not TCP or cannot be compressed—indicated by "002l"; (ii) compressed TCP—where a TCP/IP header is replaced by a compressed header—indicated by "002d"; and (iii) uncompressed TCP—where the IP protocol field is replaced by a compression slot identifier—indicated by "002F". The determined IPCP configuration options may then be used during a subsequent PPP renegotiation, resulting from a "hand off" between IWFs, of a wireless communications link employing a network model.

Figure 6:
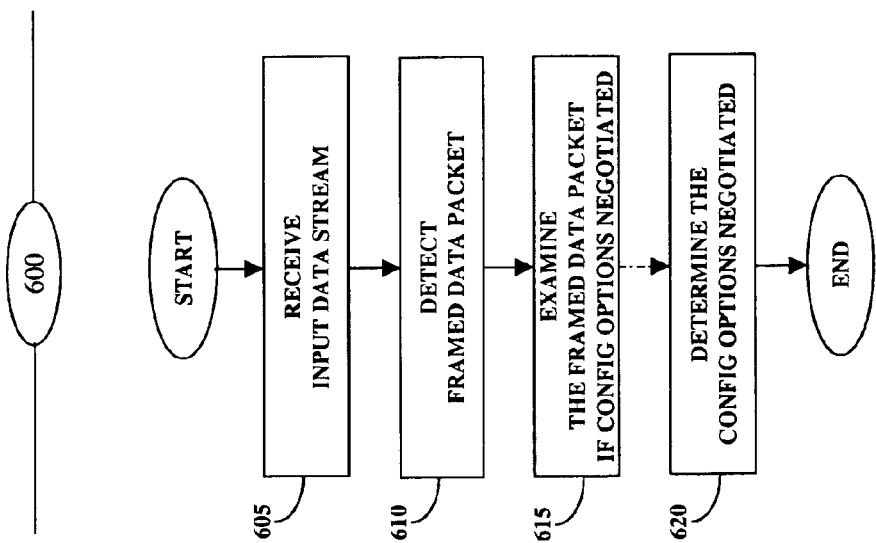
FIG. 6 depicts one embodiment of a method for determining configuration options negotiated for a wireless communications link employing a network model.

FIG. 6 depicts one embodiment of a method 600 for determining configuration options negotiated for a wireless communications link employing a network model. In block 605, the method 600 receives an input data stream from a wireless communications link employing a network model. The input data stream includes a framed data packet containing information. The framed data packet may include at least one of an HDLC packet, an IP packet, and a Van Jacobson packet. The wireless communications link employing the network model is based on configuration options negotiated, for example, between a TE2 device 102 and an IWF 108. The configuration options may include IPCP configuration options. In block 610, the method 600 detects the framed data packet from the input data stream. In block 615, the method 600 then examines at least a portion of the information of the detected framed data packet when the configuration options of the wireless communications link employing the network model have been negotiated.

In block 620, the method 600 may (denoted by a dashed arrow) determine the configuration options negotiated for the wireless communications link employing the network model based on the examination of the at least a portion of the information of the detected framed data packet. The determined configuration options negotiated may then be used for renegotiation of the wireless communications link. The renegotiation of the wireless communications link may result from a "hand off" between a first IWF 108 and a second IWF 108.

Figure 7:
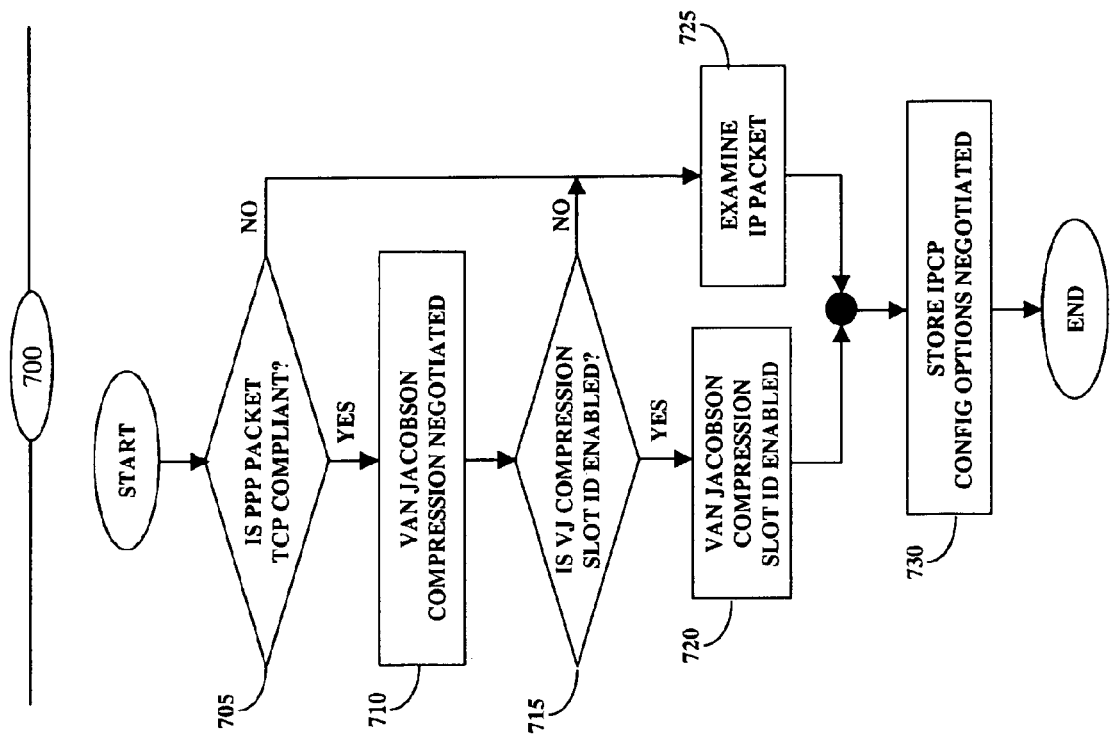
FIG. 7 depicts an implementation of a method for determining configuration options negotiated for a wireless communications link employing a network model.

FIG. 7 depicts an implementation of a method for determining configuration options negotiated for a wireless communications link employing a network model. In block 705, a method 700 determines whether a detected PPP packet is TCP-compliant. In other words, the method 700 determines whether the protocol type of a detected HDLC frame comprises either the hexadecimal characters "00" and "2D" (which indicate a compressed TCP packet) or the hexadecimal characters "00" and "2F" (which indicate an uncompressed TCP packet). When the PPP packet is TCP-compliant, then the method 700 proceeds to block 710. When the PPP packet is not TCP-compliant, then the method 700 proceeds to block 725.

It should be appreciated that these protocol values can either be a single or double byte value. In fact, this condition may be used to detect whether or not protocol field compression (PFC) was negotiated, just as the absence of the leading "FF03" may be used to indicate whether or not address-and-control-field compression (ACFC) was negotiated.

Figure 1:
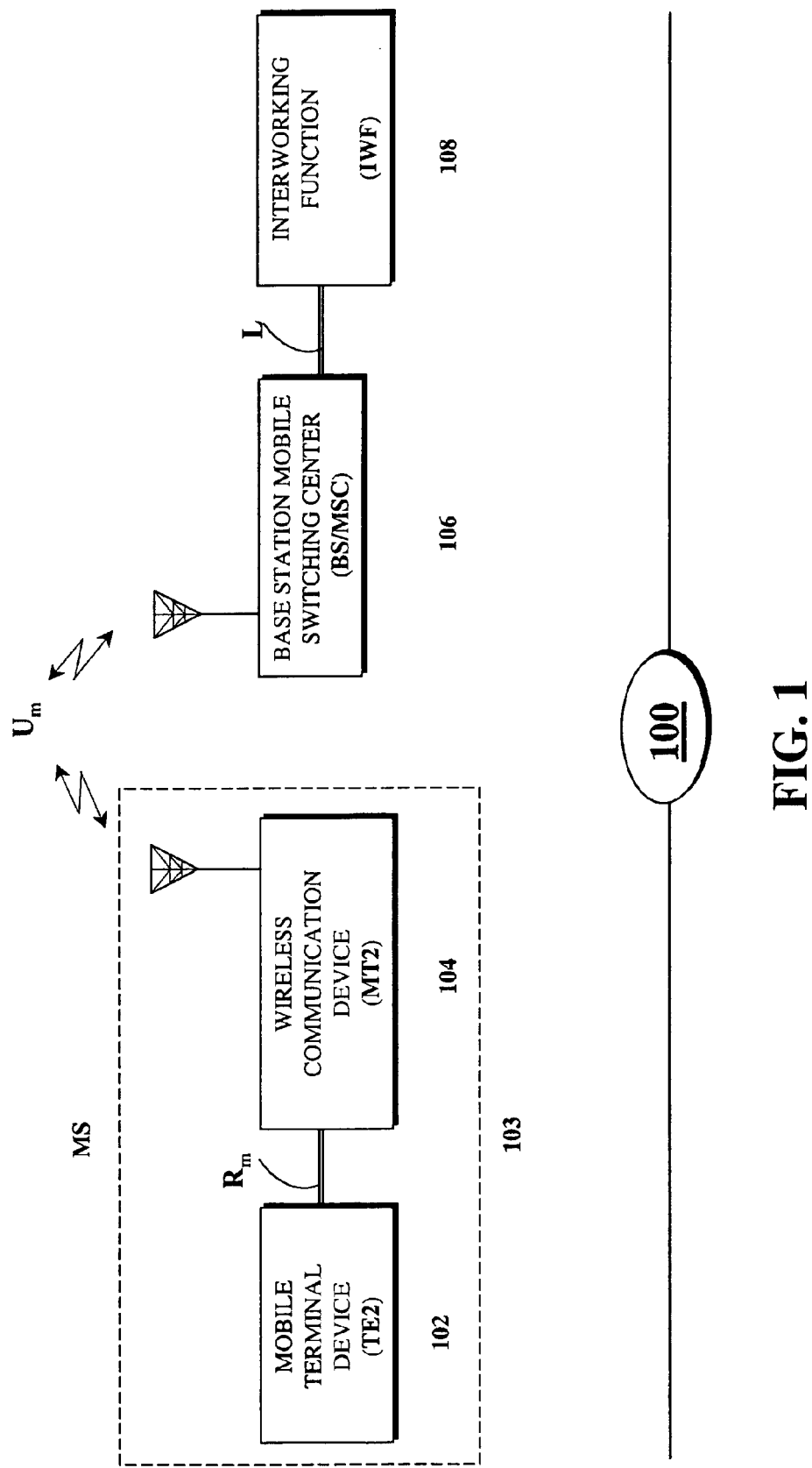
FIG. 1 depicts a high level block diagram of a wireless communication system.
Figure 2:
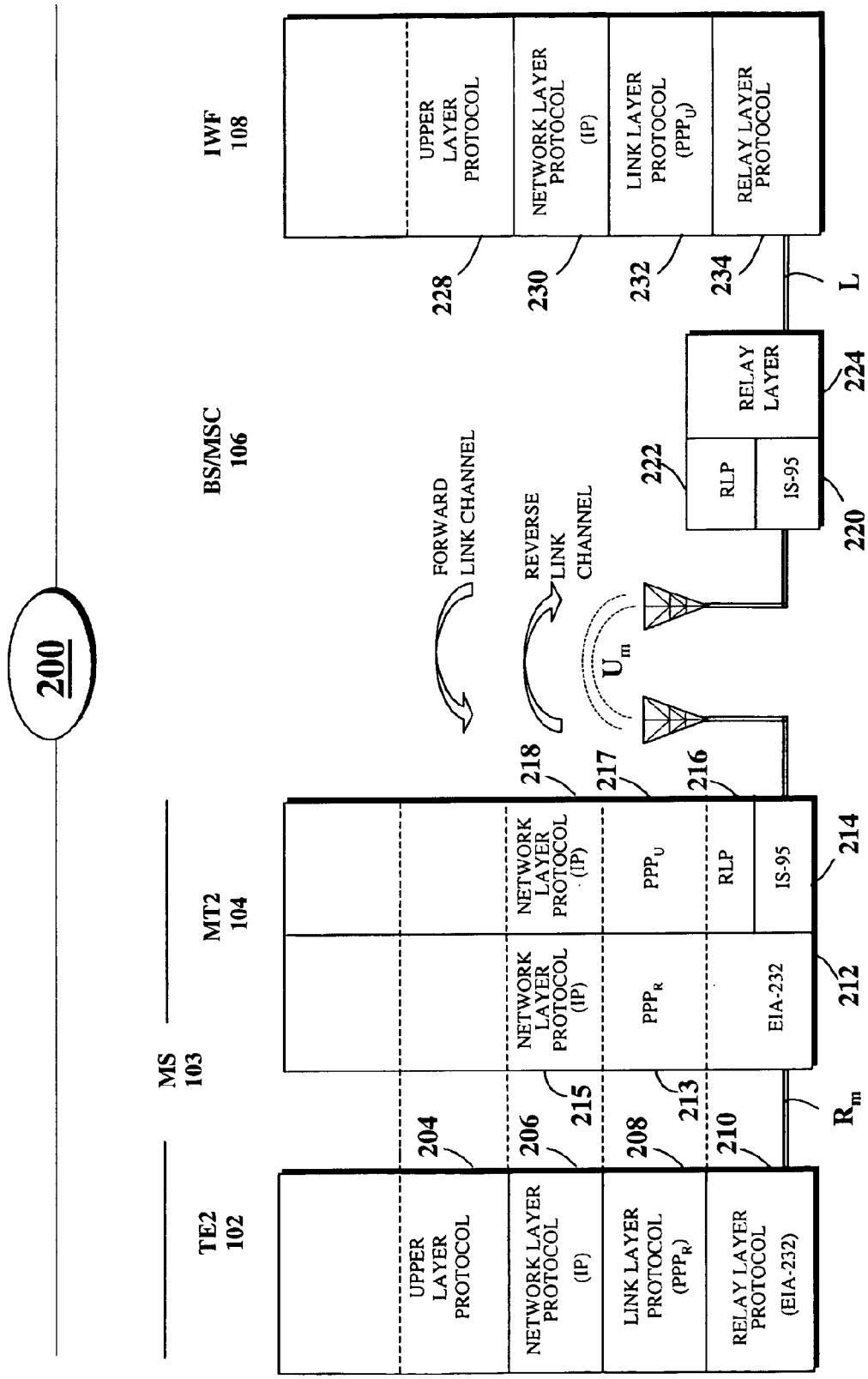
FIG. 2 schematically depicts the protocol stacks of a wireless communication system.
Figure 3:
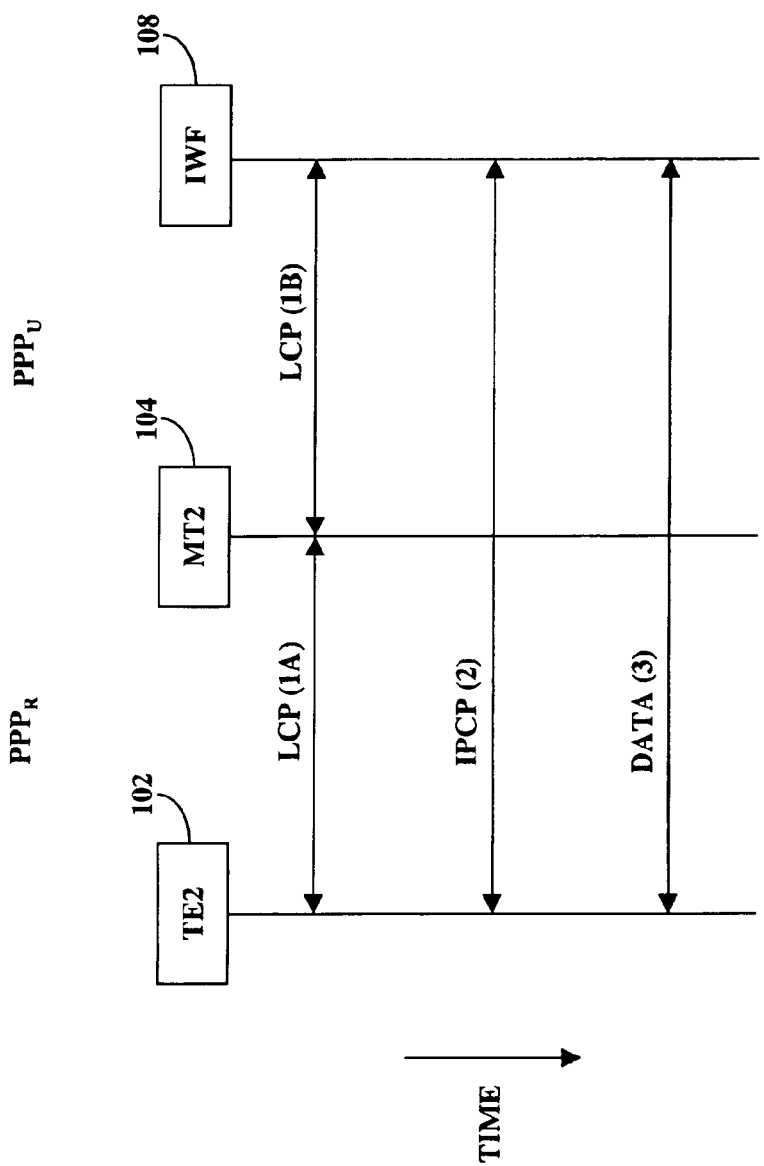
FIG. 3 depicts the data flow of a wireless communication system.

In block 710, the method 700 may establish that Van Jacobson compression has been negotiated in the direction that the packet travels (see FIG. 3). (Van Jacobson compression has been negotiated when a Van Jacobson uncompressed or compressed packet is detected.) The determination of block 705 assists in the determination of the configured option for Van Jacobson compression (i.e., the IP compression protocol option), which operates on TCP-based packet headers.

In block 715, the method 700 determines whether compression of the slot ID field in the Van Jacobson header has been enabled. When the packet has been determined, in block 705, to be a compressed TCP packet and the slot ID is not part of the header, then slot ID compression is enabled, as in block 720, on the device intended to receive the packet. When the packet is compressed and the slot ID field is present, a second packet is examined. When the second packet contains the slot ID field for the same connection, then slot ID compression has not been enabled, and the method 700 proceeds to block 730.

If block 705 determines that the PPP packet is not TCP-compliant, or if block 715 determines that compression of the slot ID field in the Van Jacobson header has not been enabled, then block 725 examines (e.g., snoops) the IP packet(s) within the information portion of the detected HDLC frame. When the PPP protocol field indicates an IP packet (and not a TCP packet), then the IP packet header is examined to determine the IP address of the source, as well as to determine if the IP packet is a TCP packet. When the PPP protocol field indicates a TCP packet, as well as an IP packet, then the method 700 establishes that Van Jacobson compression has not been negotiated.

In block 730, the method 700 stores in a storage device, such as a memory, the determined IPCP configuration options negotiated, which may include the IP address, the Van Jacobson compression, and the Van Jacobson compression slot ID.

The described embodiments thus maximize the processing resources of a communication device, such as MT2 device 104, by determining the IPCP configuration options negotiated for a wireless communications link employing a network model operation of a mobile terminal device without having to examine the IPCP configuration options of each received framed data packet. The determined IPCP configuration options may then be used during PPP renegotiation.

Figure 8:
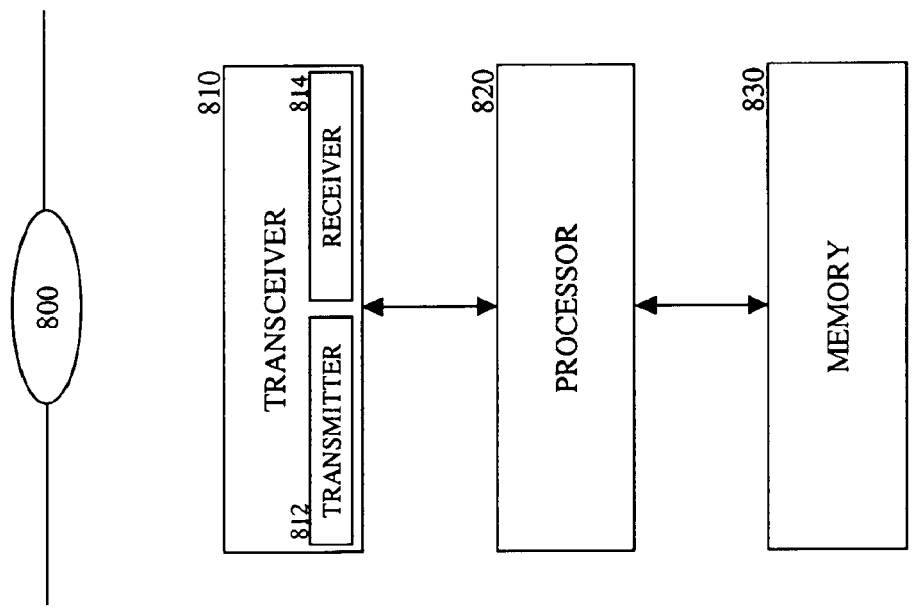
FIG. 8 depicts one embodiment of an apparatus for determining configuration options negotiated for a wireless communications link employing a network model.

FIG. 8 illustrates one embodiment of an apparatus 800 (e.g., MT2 device 104) for determining configuration options negotiated for a wireless communications link employing a network model. The apparatus 800 may comprise a transceiver 810, a processor 820, and memory 830. The transceiver 810 includes a transmitter 812 that allows the apparatus 800 to transmit information, for example, to: (i) IWF 108, which may be co-located with BS/MSC 106, via $U_m$ interface; and/or (ii) TE2 device 102, which may be integrated into a single unit with MT2 device 104, via the $R_m$ interface. The transceiver 810 also includes a receiver 814 that allows the apparatus 800 to receive information, for example, from: (i) IWF 108 via $U_m$ interface; and/or (ii) TE2 device 102 via the $R_m$ interface. Such transmission and reception operations over the $U_m$ interface and/or the $R_m$ interface may be conducted using the same or different data rates, communications protocols, carrier frequencies, and/or modulation schemes. Likewise, the operations and/or circuit configurations of the transmitter 812 and the receiver 814, respectively, may be completely independent of one another or, alternatively, may be partially or fully integrated.

The processor 820, which may comprise one or more microprocessors, microcontrollers, or other arrays of logic elements, controls the operation of the apparatus 800 according to a sequence of commands that may be (i) stored in the memory 830 or in another storage device within or coupled to the apparatus 800, (ii) entered by a user through an interface such as a data entry device (i.e., a keypad) (not shown), and/or (iii) received over the $U_m$ interface and/or the $R_m$ interface.

The memory 830, which may comprise read-only memory (ROM), random-access memory (RAM), nonvolatile memory, an optical disk, a magnetic tape, and/or a magnetic disk, stores programmable parameters and may also store information including executable instructions, non-programmable parameters, and/or other data. For example, the determined IPCP configuration options negotiated, which may include the IP address, the Van Jacobson compression, and the Van Jacobson compression slot ID, may be stored in the memory 830 and/or may be stored elsewhere within the apparatus 800. Executable instructions defining a method associated with the presented embodiments may also be stored in the memory 830 for execution by the processor 820. The method may be programmed when the apparatus 800 is manufactured or via a machine-readable medium at a later date. Such a medium may include any of the forms listed above with respect to the memory 830 and may further include, for example, a carrier wave modulated, or otherwise manipulated, to convey instructions that can be read, demodulated/decoded and executed by the apparatus 800.

In view of the foregoing, it will be apparent to one of ordinary skill in the art that the described embodiments may be implemented in software, firmware, and hardware. The actual software code or specialized control hardware used to implement the present invention is not limiting of the invention. Thus, the operation and behavior of the embodiments is described without specific reference to the actual software code or specialized hardware components. The absence of such specific references is feasible because it is clearly understood that artisans of ordinary skill would be able to design software and control hardware to implement the embodiments of the present invention based on the description herein.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile memory or a software program loaded from or into a data storage medium as machine-readable code, such code being instructions executable by an array of logic elements such as a microprocessor or other digital signal processing unit, or some other programmable machine or system. As such, the present invention is not intended to be limited to the embodiments shown above, any particular sequence of instructions, and/or any particular configuration of hardware but rather is to be accorded the widest scope consistent with the principles and novel features disclosed in any fashion herein.

What is claimed is:

1. A method of determining configuration options negotiated for a wireless communications link employing a network model, the method comprising:

receiving an input data stream from the wireless communications link, the input data stream including at least one framed data packet containing information regarding the network model employed by the wireless communications link, the network model being based on negotiated configuration options;

determining whether the at least one framed data packet is TCP-compliant;

if the at least one framed data packet is TCP-compliant, then examining a portion of the at least one framed data packet rather than examining the at least one frame data packet;

storing the portion of the at least one framed data packet; and performing a renegotiation of the network model employed by wireless communications link by using the stored portion of the at least one framed data packet.

2. The method of claim 1, wherein the portion of the at least one framed data packet comprise negotiated configuration options.

3. The method of claim 2, wherein the at least one framed data packet includes an HDLC packer.

4. The method of claim 2, wherein the at least one framed data packet includes an IP packet.

5. The method of claim 2, wherein the at least one framed data packet includes a Van Jacobson packet.

6. The method of claim 1, wherein the renegotiation of the wireless communications link results from a "hand off" between a first IWF and a second IWF.

7. The method of claim 2, wherein the configuration options include IPCP configuration options.

8. The method of claim 2, wherein the configuration options are negotiated between a TE2 device and an IWF.

9. A machine-readable medium having encoded formation, which when read and executed by a machine causes a method comprising:

receiving an input data stream from the wireless communications link employing the network model, the input data stream including at least one framed data packet containing information regarding the network model employed by the wireless communications link, the network model being based on negotiated configuration options;

determining whether the at least one framed data packet is TCP-compliant;

if the at least one framed data packet is TCP-compliant, then examining a portion of the at least one framed data packet rather than examining the at least one frame data packet;

storing the portion of the at least one framed data packet; and performing a renegotiation of the network model employed by the wireless communications link by using the stored portion of the at least one framed data packet.

10. The machine-readable medium of claim 9, wherein the portion of the at least one flamed data packet comprise negotiated configuration options.

11. The machine-readable medium of claim 10, wherein the at least one framed data packet includes an HDLC packet.

12. The machine-readable medium of claim 10, wherein the at least one framed data packet includes an IP packet.

13. The machine-readable medium of claim 10, wherein the at least one framed data packet includes a Van Jacobson packet.

14. The machine-readable medium of claim 9, wherein the renegotiation of the wireless communications link results from a "hand off" between a first IWF and a second IWF.

15. The machine-readable medium of claim 10, wherein the configuration options include IPCP configuration options.

16. The machine-readable medium of claim 10, wherein the configuration options are negotiated between a TE2 device and an IWF.

17. An apparatus for determining configuration options negotiated for a wireless communications link employing a network model, the apparatus comprising:

a receiver to receive an input data stream from a wireless communications link employing a network model, the input data stream including at least one framed data packet containing information regarding the network model employed by the wireless communications link, the network model being based on negotiated configuration options; and a processor coupled to the receiver, the processor being configured to determine whether the at least one framed data packet is TCP-compliant, to examine a portion of the at least one framed data packet rather than examine the at least one frame data packet if the at least one framed data packet is TCP-compliant, to store the portion of the at least one framed data packet; and to perform a renegotiation of the network model employed by the wireless communications link by using the stored portion of the at least one framed data packet.

18. The apparatus of claim 17, wherein the portion of the at least one framed data packet comprise negotiated configuration options.

19. The apparatus of claim 18, wherein the at least one framed data packet includes an HDLC packet.

20. The apparatus of claim 18, wherein the at least one framed data packet includes an IP packet.

21. The apparatus of claim 18, wherein the at least one framed data packet includes a Van Jacobson packet.

22. The apparatus of claim 17, wherein the renegotiation of the wireless communications link results from a "hand off" between a first IWF and a second IWF.

23. The apparatus of claim 18, wherein the configuration options include IPCP configuration options.

24. The apparatus of claim 18, wherein the configuration options are negotiated between a TE2 device and an IWF.

* * * * *